March 24, 1936.  V. L. RONCI ET AL  2,034,879
RESILIENCE AND STIFFNESS TESTING DEVICE
Filed Dec. 1, 1933   2 Sheets-Sheet 1
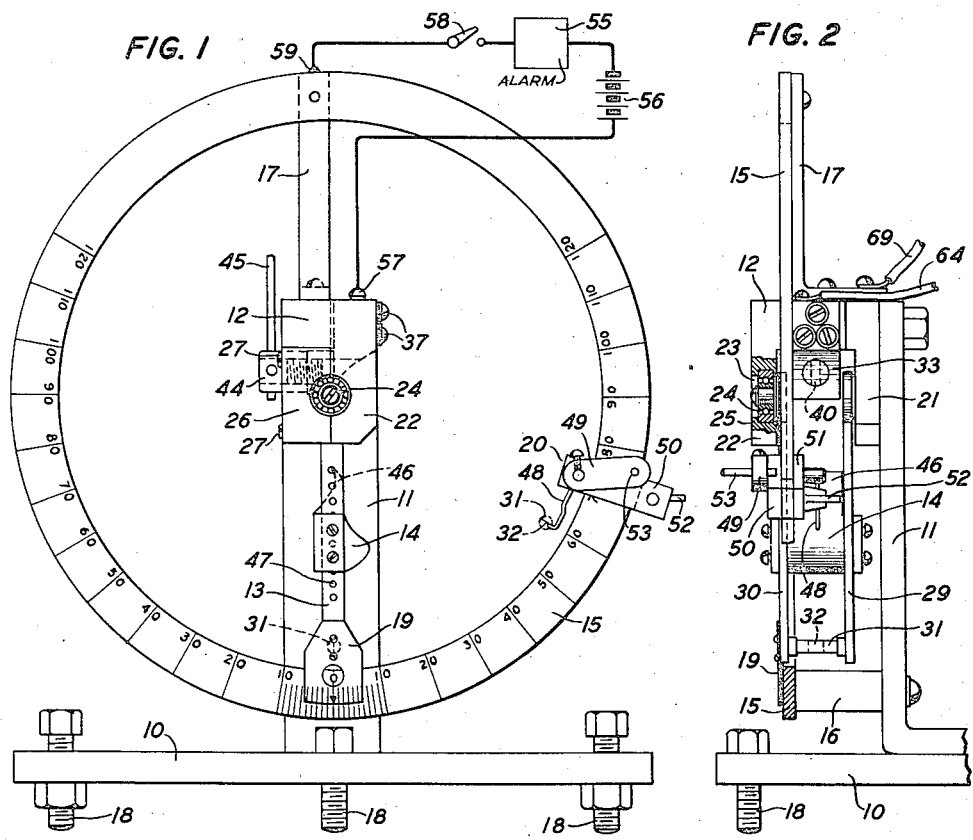
INVENTORS: V. L. RONCI
D. A. S. HALE
BY Walter C. Kiesel
ATTORNEY March 24, 1936.   V. L. RONCI ET AL   2,034,879
RESILIENCE AND STIFFNESS TESTING DEVICE
Filed Dec. 1, 1933   2 Sheets-Sheet 2

INVENTORS: V. L. RONCI
D. A. S. HALE
BY
Walter C. Kiesel
ATTORNEY

Patented Mar. 24, 1936

2,034,879

UNITED STATES PATENT OFFICE 2,034,879

RESILIENCE AND STIFFNESS TESTING DEVICE

Victor L. Ronci and Douglas A. S. Hale, Brooklyn, N. Y., assignors to Bell Telephone Laboratories, Incorporated, New York, N. Y., a corporation of New York Application December 1, 1933, Serial No. 700,404

8 Claims. (Cl. 265—13)

This invention relates to testing devices and more particularly to such a device for determining the characteristics of refractory materials.

In sensitive and accurate apparatus, particularly in the communication art, the requirements of precision and stability are very often destroyed by inferior or non-uniform material. For instance, fine wire of good commercial grade may not be continuously uniform in stiffness for a given diameter, or sheet metal may have flaws which are not easily detected by the usual thickness gauge. A satisfactory criterion for determining these defects is the bending index of the material.

An object of this invention is to determine commercially the elastic properties of materials and particularly metals.

Another object of the invention is to obtain an accurate and sensitive measurement of the degree of bend imparted to a specimen under test.

In accordance with this invention an efficient and accurate test of resilience or stiffness of wire, for example, is obtained in a mechanism of the pendulum lever type comprising a scale with a pendulum pivoted at the axis of the scale and a locking member adjustable on the scale for varying the pendulum angle. A pair of jaws at the axis of the scale support the specimen of wire rigidly in suspension with the free end of the specimen adapted to be struck by the pendulum arm. A mass of known weight carried by the pendulum arm imparts the required kinetic energy to the pendulum arm so that the resistance of the specimen to the percussive force of the pendulum upon impact with the specimen is an accurate and reliable measure of the degree of bend occurring in the specimen.

In order to measure the bending degree of the specimen in accordance with a method of this invention a sensitive contact test determines the amount of bend produced in the specimen. This is accomplished by advancing the pendulum arm from a normal zero position on the scale to an abnormal position determined by the amount of bend produced in the specimen under test and connecting a signaling circuit between the specimen and the scale to indicate when the pendulum arm makes contact with the specimen at the maximum degree of bend. It will be observed that the pendulum arm serves as a circuit closing switch for the signaling circuit and at the same time indicates on the scale the maximum degree of bend produced in the specimen. This test is of particular advantage when very fine wire is used as the specimen, since it is extremely difficult to measure the degree of bend in the specimen by either feel or sight of the operator. A more sensitive test may be obtained by employing a signaling circuit embodying a gaseous electronic tube of the trigger type, in order to detect the instantaneous engagement between the pendulum arm and the bent specimen of wire under test.

These and other features of the invention will be more clearly understood from the following detailed description in connection with the accompanying drawings:

Fig. 1 is a front view in elevation of a bending resistance measuring device made in accordance with this invention showing the pendulum lever in normal position and the signaling circuit for detecting the degree of bend produced in the specimen under test;

Fig. 2 is a side view in elevation of the device shown in Fig. 1 with portions broken away to show details of construction;

Fig. 3 is a schematic view of a sensitive detecting test circuit employing a gaseous electronic device for indicating an instantaneous contact between the pendulum arm and the specimen under test;

Fig. 4 is an enlarged detail view in perspective of the supporting block for the specimen and the pendulum arm with portions of the block broken away to show various details of assembly;

Figure 5:
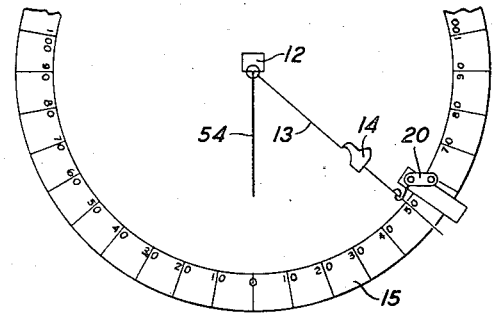
Fig. 5 is a diagrammatic view of the essential elements of the testing device and shows the pendulum arm held at a position prior to striking the specimen.

The requirements for commercial testing of wire, for example, particularly to determine stiffness or resistance values, necessarily impose certain restrictions on the structure of a device for performing such tests. The device must be simply constructed in order that it may be used by unskilled operators in the field as well as being used in the manufacturing plant. It must be accurate since the manufacturing, ordering and acceptance of wire materials are dependent on the tests. It must be capable of making many tests in a short space of time. Furthermore, in view of the fact that the test is a commercial one the use of special technique in obtaining and using the testing data is to be avoided.

A very suitable mechanism which overcomes the above restrictions and at the same time affords an efficient and practical device which will meet commercial requirements is a fundamental system, such as a pendulum. The mechanism may be made simple thereby permitting inexpensive construction and giving long life. The energy available for bending specimens may be varied within wide limits and the device may be made quite small and yet have a wide range of usefulness, both from the standpoint of range of diameters of wires that can be tested and the testing of other materials, such as rectangular rod and sheet metal.

However, in order to apply the pendulum principle to the accurate and sensitive measurement of the stiffness of wire it is essential that the energy of the pendulum should be completely balanced by the stiffness deformation of the specimen so that all the energy is absorbed in bending the specimen and that certain sources of loss of energy must be minimized or eliminated. The principal sources of loss of energy are hinge friction, windage, twisting, bending and vibration of the pendulum arm or lever and displacement of the center of gravity from point of impact. These forces tend to mask the real characteristics of the wire specimen under test and cause various changes to such an extent that sensitive measurements cannot be obtained.

Accordingly, the following specification explains the construction and desirable advantages of a testing mechanism of this invention employing the pendulum principle. The essential elements of the mechanism are shown in Fig. 1 and consist of a rigid heavy base 10, preferably of metal, an upright standard or support 11 of sufficient rigidity to withstand vibration, a hub block 12 fastened to the end of the standard 11, a swinging pendulum arm or lever carrying a weight or mass 14, and an upright scale 15 in the form of a circle supported from the standard 11 by a metallic spacer 16 and connected to the block 12 by a metallic strip 17. The base 10 is provided with leveling screws at the corners and intermediate points on the edges of the base to insure the proper suspension of the pendulum arm 13 and to avoid the setting up of friction losses which might occur if the pendulum is not perpendicular to the base. In order to aid in the leveling of the device the pendulum arm 13 is provided with a template 19 having a sight and arrow point, to determine when the pendulum is adjusted to zero or normal position on the scale 15. The scale is marked in degrees increasing from zero to 120 on the right-hand side thereof and this side of the scale determines the pendulum angle for imparting the necessary energy to the pendulum for striking the specimen of wire under test. The left-hand side of the scale is marked in degrees to determine the action angle through which the specimen is bent by the application of the percussive force of the pendulum. In accordance with this invention a trip latch 20 is mounted on the right-hand side of the scale and is adjustable for varying the pendulum angle through which the pendulum arm 13 swings.

The hub block 12, as shown in Fig. 4, is formed of a rectangular piece of metal, such as brass or aluminum, having a rectangular cut-out portion formed in one of the lateral side surfaces and is also provided with downwardly extending side walls 21 and 22 on opposite sides of the cut-out portion. The inner edges of the walls 21 and 22 are coincident with the vertical axis of the device as determined by the zero position on the circular scale and a semi-circular opening 23 is cut in each of these edges, to form seats for frictionless bearings 24, of the ball bearing type, which are held in position by a flange 25 formed on the walls 21 and 22 adjacent the opening 23 and on a metallic plate 26 having a semi-circular opening similar to the opening 23, the plate being fastened edgewise to the wall 22 by screws 27. Another plate 28 secures the other frictionless bearing in the wall 21 of the block 12. Attached to the hubs of the frictionless bearings 24 are two parallel arms 29 and 30 which are joined together at their lower ends and spaced in parallel relation by a rod member 31. The rod 31 is undercut at 32 to provide a toe-piece for supporting the arm of the pendulum by the latch 20. The hub block 12 also serves as a support for the clamping member of the device and this clamping member consists of a stationary jaw member 33 which fits into the rectangular slot in the block 12, but is insulated therefrom by an insulating plate 34 at the back of the jaw and by insulating sleeves 35 and insulating washers 36 surrounding the screws 37. The lower end of the stationary jaw carries a cylindrical butt member 38 which is fitted and pinned in the jaw and extends transverse to the face of the jaw. The butt member 38 is threaded at 39 and is also provided with a slot 40 shown in Fig. 2 which is arranged perpendicular to the axis of the butt member and parallel to the plane of the face of the jaw 33. A movable rectangular jaw 41 having a large central opening slides outwardly on the butt member 38 by means of guide pins 42 and helical springs 43 fitting into diametrically opposite corners of the jaw 41. The movable jaw 41 is brought into engagement with the stationary jaw by a clamping nut 44 which is manipulated by a handle 45. It will be noted that the face of the stationary jaw of the clamping member is in alignment with the axis or pivotal point of the pendulum arm so that irrespective of the diameter of the wire which is to be tested the point of contact between the pendulum arm and the specimen will always be the same.

The mass or weight 14 carried by the pendulum arm 13 is provided with an upwardly extending finger piece 46 which applies the percussive force to the specimen to be tested and this mass is arranged to be adjusted in various positions on the arm 13 by the accurately spaced holes 47 in order to apply bending force to various lengths of specimens. The center of gravity of the mass 14 and the pendulum arm 13 is always at or near the center of percussion of the pendulum, due to the proportioning of the mass and the adjustment thereof with respect to the length of specimen being tested. The pendulum arm 13 is elevated to a desired pendulum angle until the toe-piece 32 is engaged by a hook member 48 which is rigidly fastened on a pivoted block 49 supported on two metalic straps 50 and 51 which lie on opposite sides of the scale 15 and are clamped to the scale by a wing nut 52. The latch is tripped by elevating the lever pin 53 in order to disengage the hook 48 from the toe-piece 32 of the pendulum arm.

In accordance with this invention the percussive energy of the pendulum arm and weight is completely absorbed in the bending of a specimen of wire and the amount of bend produced in the specimen is therefore a true index of the stiffness of the material. In order to utilize the potential energy of the pendulum it is necessary that the weight of the pendulum and mass be concentrated at their common center of gravity. The potential energy possessed by a pendulum of this character in the position before release is given by $W x H$, where $W$ is the weight of the pendulum and $H$ is the distance its center of gravity falls through before contacting with the specimen. If the position of the pendulum in accordance with this invention is vertical when the specimen is struck, $H$ becomes $R - R \cos A$ where $A$ is the raised angle and $R$ is the distance from the center of gravity to the center of the hinge or axis of the pendulum. As examples of the potential energy of the present pendulum system, when $A$ is 20, 25, 30, 35, 40, 45 and 50° respectively, $R$ is 14 centimeters, and $W$ is 205 grams, the energies for the respective angles are approximately 172, 268, 382, 499, 672, 841, and 1023 centimeter grams, respectively. These energies are assumed completely converted into kinetic energy at the point of percussion.

A specimen may be measured in the device of this invention either for its elasticity or for its stiffness depending on the paramount quality which is desired to be known. For instance, a specimen of a short wire placed in the clamping jaws of the device will have a certain degree of inherent stiffness which will counteract the percussive force of the mass on the pendulum when released from a point, such as 20 degrees, on the right-hand side of the scale. However, if the mass and pendulum are elevated to 50 degrees and released, the percussive force of the pendulum and mass will overcome the inherent stiffness to produce a bend in the specimen and the resistance of the specimen to the bending force or strain is a measure of the stiffness of the specimen. On the other hand, when the elasticity or resilience of the specimen is the paramount quality to be determined, the force required to produce a permanent set in the specimen by bending the specimen beyond its elastic limits may be calculated and the degree of bend produced in the specimen may be measured on the scale.

Figure 6:
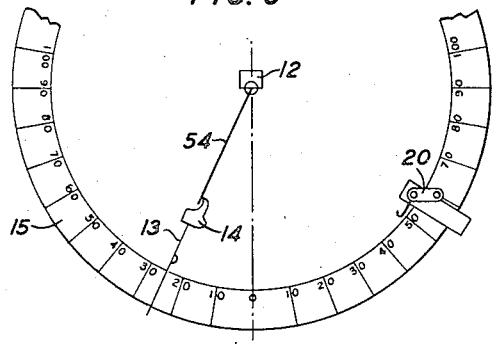
Fig. 6 is a similar diagrammatic view showing the position of the pendulum after impact with the specimen.

In order to realize the effect of the energy force of the pendulum when applied to the bending of a specimen of wire to be tested, attention is directed to Figs. 5 and 6 in which Fig. 5 shows a specimen 54 held between the jaws 41 and 33 in the block 12. The manner of supporting the specimen consists in turning the handle 45 to rotate the nut 44 in a counter-clockwise direction whereby the movable jaw 41 is forced outwardly by the helical springs 43 and the specimen of wire 54 may be fitted into the slot 40 in the butt member 38. The movable jaw may be tightened by turning the handle 45 in a clockwise direction to securely hold the specimen in a position as indicated in Fig. 5. It will be noted that the lower edges of the jaws of the clamping device are in alignment with the axis or hinge point of the pendulum lever 13 and, therefore, the length of the specimen from the edges of the jaws to the extremity of the specimen determines the length under test.

Assuming the mass or weight 14 on the pendulum arm is adjusted in position for the desired length of specimen under test it is only necessary to apply sufficient energy to the mass by raising the pendulum to a desired pendulum angle. This is accomplished by raising the pendulum arm until the toe-piece 32 engages the hook member 48 to hold the pendulum arm in its elevated position. The pendulum arm is released by lifting the latch block 49 by means of the pin 53, thereby releasing the hook member 48 from the toe-piece 32 without introducing friction losses at the beginning of the swing. Since the potential energy developed in the pendulum arm and mass is generated in the arc of the pendulum angle beginning at the point of rest to the zero position on the scale, it is evident that this whole force is applied to bending the specimen as indicated in Fig. 6. In the latter figure the pendulum arm is shown in its greatest advanced position in the action angle to indicate that the bending continues until the resistance to deformation of the specimen 54 absorbs all the energy of the pendulum arm. When this energy is dissipated the pendulum arm swings back from the specimen and may be stopped or held by suitable means to prevent the pendulum again striking the specimen.

Figure 7:
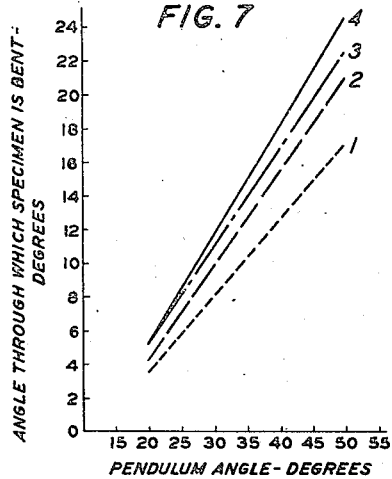
Fig. 7 is a graphic representation of different lengths of specimens showing the straight line characteristics when the bending angle is plotted against the pendulum angle.

Fig. 7 shows the relation between the energy applied at various positions in the pendulum angle on a number of specimens of the same diameter of wire and the resultant bending index of these specimens. The consecutive legends applied to the characteristics denote test lengths of 1, 1.5, 2, and 2.5 centimeters of .060″ diameter of nickel wire. It will be noted that in each case the characteristic is a straight line indicating that the bend index of the wire specimen bears a uniform relation to the pendulum angle and therefore is a measure of the stiffness or elasticity of the specimen under test.

As shown in Figs. 5 and 6, the test specimen 54 does not extend the full length to the scale and therefore it would be extremely difficult to gauge the measurement or bending index of the specimen merely by sight. This difficulty is eliminated by a method of accurate measurement of the bending index by raising the pendulum arm from its normal vertical position to a position on the scale where the point of the finger 46 on the mass comes in contact with the specimen, then the angle of bend can easily be read on the scale by means of the eyesight on the template 19 or the arrow. This type of test is satisfactory for fairly rigid wire since the operator can readily feel the engagement of the finger on the mass with the specimen. However, when fine wires are to be tested, the sensitivity of feeling is not accurate enough. Therefore, this invention contemplates a method of testing to detect the instantaneous contact of the finger 46 with the specimen under test. This is accomplished by a signal or alarm circuit as shown in Fig. 1 which consists of an alarm 55, which may be a bell or a lamp, connected on one side to a battery 56 which is connected to the insulated stationary jaw 33 by a screw 57. A switch 58 connected to the alarm and a point 59 on the scale completes the circuit for detecting the instant when the finger 46 engages the specimen. This test is carried out by closing the switch 58 and raising the lever arm 13 until the finger 46 engages the specimen 54, as shown in Fig. 6, to thereby close the circuit for the alarm 55 through the battery 56, jaw 33, specimen 54, finger 46, arm 13, supporting block 12, angle piece 17 to the alarm 55. It is evident that instantaneous contact between the finger on the lever arm and the specimen is easily detected by this method. It is obvious that the abnormal condition of the bent specimen will not be exaggerated by the lifting of the pendulum arm into contact with the specimen and therefore a true and accurate measurement of the bend produced in the specimen may be obtained.

A more sensitve detecting circuit is illustrated in Fig. 3 and this test circuit may be used with extremely fine wire. This circuit may be used for making either a single or a repeating test in order to check the reading on the scale 15. The circuit employs a gaseous electronic device 60 which includes a heater element 61 supplied with heating current through a transformer 62 from a line having an alternating current or direct current source. The heater energizes an electron emitting cathode 63 which is connected to one side of the testing circuit 64 and may be attached to the insulated stationary jaw 33, as shown in Fig. 2. A grid or control electrode 65 is connected to the cathode through a biasing circuit including a grid leak 66 and a battery 67. The grid 65 is also connected to the other side of the test circuit through a resistance 68 and terminal 69 which may be connected to the block 12, as shown in Fig. 2. An anode or plate electrode 70 in the electronic device is connected to a signal lamp 71 and through a contact and armature of relay 72 to a battery 73 of suitable potential and the battery is connected to the cathode through a conductor 74.

In the operation of this circuit the cathode is energized by the heater to emit electrons across the intervening space between the cathode and the anode 70, but due to the biasing potential on the grid 65 no current is permitted to flow in the electronic device. The current is only permitted to flow across the elements of the device when the equilibrium of the grid is disturbed and therefore the electronic device performs the function of a trigger tube. Consequently, the device is extremely sensitive to a minute change in the equilibrium of the grid potential. Accordingly, when it is decided to make a test on a specimen which has been bent by the pendulum arm 13 in the device of this invention, the pendulum arm is raised to an angle where the finger 46 of the mass on the arm comes in contact with the length of specimen. The contact of the finger of the mass with the specimen immediately closes a circuit through the electronic device and the equilibrium of the grid is disturbed so that a current flows between the cathode and the anode. This current is sufficient to complete the circuit including the battery 73 and the lamp 71 to indicate the instantaneous contact between the finger of the mass and the specimen and thereby determine the angle of bend produced in the specimen. The control of the electronic device and the signal 71 after operation may be governed by opening switch 75. In order to provide a repeating test, a switch 76 is included in the circuit between the relay 72 and the signal lamp 71. With the switch 76 closed and a test being conducted to detect the contact of the finger 46 and the specimen, the grid 65 assumes control when the contact occurs and permits a flow of current to the plate 70 and this current traverses the parallel paths to the relay 72 and the signal lamp 71 through the contact and armature of relay 72 to the battery 73. When the relay 72 is energized it immediately breaks the battery circuit and the grid 65 immediately assumes control of the space current in the device 60. The relay 72 functions as an automatic switch to disconnect the battery 73 from the anode by the breaking of the connection between the armature and contact of the relay and therefore discontinues the flow of current to the anode in the electronic device. Consequently, the grid 65 regains its equilibrium to return the test circuit to normal. However, if contact with the specimen is still being maintained, the equilibrium of the grid is again disturbed and current flows to the anode to establish the alarm circuit and the cyclic operation of relay 72. The angle of deflection of the specimen is then indicated on the scale by the position of the arm 13 and this position may be checked by again raising the arm 13 to perform the above operations without any further manual operation of the testing circuit as shown in Fig. 3.

It will be realized that with a device of this invention the stiffness or resilience values of wire materials may be standardized so that the purchaser of the wire need only test a specimen of wire he desires on a machine of this invention and place an order with the manufacturer specifying the pendulum angle and the action angle for a given diameter of wire. The manufacturer tests various specimens on a similar type of machine using the angles indicated in the order in order to arrive at the desired stiffness value. When the wire is received by the purchaser a specimen of the order is tested on the machine to see that it meets the requirements specified.

While the invention has been described in connection with the testing of wire materials it is apparent that the invention may be utilized for the testing of other materials, such as rectangular rod or sheet metal, which may be tested for stiffness or resistance deformation characteristics. It is also evident that various details of construction of the device may be changed or modified to suit individual requirements and such modifications are intended to be within the scope of the invention as defined in the appended claims.

What is claimed is:

1. A machine for testing the resilience of rigid material comprising clamping means for suspending a specimen of the material to be tested, an arcuate indicator scale having its axis positioned substantially at the junction of the specimen and said clamping means, a pendulum pivotally supported at the axis of said scale for striking the specimen, and holding means for said pendulum cooperative with said scale for determining the pendulum angle with reference to the energy to be applied to the specimen.

2. A machine for indicating the bending index of elastic refractory material comprising an arcuate scale, an oscillating pendulum arm pivoted at the axis of said scale, clamping means adjacent the pivotal point of said arm, and means for detecting the amount of permanent set imparted to the specimen.

3. The combination in an elastic testing machine for refractory material which comprises a pendulum lever adapted to apply a percussive impact to a specimen, a support for the specimen positioned at the axis of said lever, a scale for indicating the action angle and pendulum angle of said lever, and an electrical contact circuit including an alarm connected between said support and said pendulum for indicating the angle of permanent set of the specimen on said scale determined by the abnormal position of the specimen after impact by said pendulum.

4. The combination in an elastic testing machine for refractory material which comprises means for supporting a specimen, a pendulum lever adapted to apply a percussive impact to a specimen supported at the axis of said lever, a scale for indicating the action angle and pendulum angle of said lever, and an electronic trigger circuit connected to the specimen supporting means and said pendulum, whereby the engagement of said pendulum with said specimen energizes said circuit to indicate the angle of permanent bend produced in said specimen.

5. A bending-resistance measuring device comprising a stationary base, leveling means for said base, a standard projecting from said base, a block carried by said standard, an insulated clamping member supported by said block for rigidly suspending the specimen, a pendulum lever pivotally connected to said block, a circular scale member attached to said base, a trip latch on said scale for said pendulum, and a percussion impact member carried by said pendulum lever for applying a force to the specimen adjacent the pivotal point of said pendulum to produce a bend in said specimen, and an electrical alarm circuit connected to said insulated clamping member and said block.

6. A testing mechanism for determining the stiffness of metallic specimens comprising a rigid base, an upright standard thereon, a percussion type pendulum lever, a frictionless bearing suspending said lever from said standard, a clamping member adjacent the pivotal point of said lever, said member being adapted to support the specimen to be tested in a suspended position coincident with the normal position of said pendulum, a graduated scale supported by said base in a path followed by the end of said pendulum, holding means for said pendulum at an elevated angle on said scale, a mass on said pendulum adapted to strike the suspended end of said specimen and means for adjusting the position of said holding means depending on the energy intended to be applied to said pendulum.

7. A testing mechanism for determining the stiffness of metallic specimens comprising a rigid base, an upright standard thereon, a percussion type pendulum lever, a frictionless bearing suspending said lever from said standard, a clamping member adjacent the pivotal point of said lever, said member being adapted to support the specimen to be tested in a suspended position coincident with the normal position of said pendulum, a graduated scale supported by said base in a path followed by the end of said pendulum, a mass of known weight on said pendulum adapted to strike the suspended end of said specimen, and means for adjusting the position of said mass with respect to different lengths of specimens.

8. A testing mechanism for determining the stiffness of metallic specimens comprising a rigid base, an upright standard thereon, a percussion type pendulum lever pivotally supported by said standard, said pendulum having parallel arms, a clamping member insulatingly supported by said standard adjacent the pivotal point of said pendulum, a graduated scale extended above said base in a path followed by the end of said pendulum, a latch member supported on said scale to determine the action angle of said pendulum, and a mass member connected between said arms at a point suitable for applying a percussive impact to said specimen held in said clamping member.

VICTOR L. RONCI.
DOUGLAS A. S. HALE.